United States Patent [19]
Lee

[11] Patent Number: 5,748,722
[45] Date of Patent: May 5, 1998

[54] COLLECTIVE-HOUSE CONTROL SYSTEM EMPLOYING AN INTERFACE CIRCUIT FOR ALTERNATIVE MARK INVERSION CONTROL COMMUNICATION

[75] Inventor: Jong-young Lee, Suwon, Rep. of Korea

[73] Assignee: Samsung Electronics Co., Ltd., Kyungki-Do, Rep. of Korea

[21] Appl. No.: 659,826

[22] Filed: Jun. 7, 1996

[30] Foreign Application Priority Data

Jun. 7, 1995 [KR] Rep. of Korea ............... 1995/14931

[51] Int. Cl.$^6$ ..................... H04M 1/60; H04J 3/00; H04N 7/14
[52] U.S. Cl. ............. 379/160; 379/167; 379/93.05; 370/529; 340/825.04; 348/13; 455/6.1
[58] Field of Search ................. 379/167, 168, 379/170, 173, 156, 159, 160, 165, 93.01, 93.05, 93.08; 370/521, 522, 524, 527, 528, 529; 340/825.03, 825.04; 348/13, 14, 16, 17; 455/3.1, 5.1, 6.1, 6.2

[56] References Cited

U.S. PATENT DOCUMENTS

| | | | |
|---|---|---|---|
| 4,952,070 | 8/1990 | Leedke et al. | 370/527 |
| 4,959,713 | 9/1990 | Morotomi et al. | 348/156 |
| 5,125,026 | 6/1992 | Holcombe | 379/167 |
| 5,398,249 | 3/1995 | Chen et al. | 370/524 |

*Primary Examiner*—Wing F. Chan
*Assistant Examiner*—Paul Loomis
*Attorney, Agent, or Firm*—Sughrue, Mion, Zinn, Macpeak & Seas, PLLC

[57] ABSTRACT

A collective-house control system is provided which employs an interface circuit for alternative mark inversion (AMI) communication. The interface circuit has a data detecting unit, a controlling unit, and an AMI signal generating unit. The data detecting unit receives input AMI signals from a single coaxial line and detects first control data within the input AMI signal. The controlling unit receives the first control data and generates a corresponding output signal. Also, controlling unit inputs second control data and generates first and second signals for generating an output AMI signal. The AMI signal generating unit inputs the first and second signals and generates the output AMI signal in accordance with such signals. The interface circuit may also include a collision detecting unit and a logic circuit unit. The collision detecting unit detects a collision between the first control data and detected control data and outputs a collision detecting signal if the collision is detected for certain period of time. The logic circuit unit masks the first and second signals output from the controlling unit in response to the collision detecting signal. Also, the logic circuit unit generates the detected control data based on the first and second signals output from the controlling unit and outputs such data to the collision detecting unit.

22 Claims, 6 Drawing Sheets

COLLECTIVE-HOUSE CONTROL SYSTEM EMPLOYING AN INTERFACE CIRCUIT FOR ALTERNATIVE MARK INVERSION CONTROL COMMUNICATION

FIELD OF THE INVENTION

The present invention relates to a collective-house control system. More particularly, the present invention relates to a collective-house control system employing an interface circuit for alternative mark inversion (AMI) control communication.

BACKGROUND OF THE INVENTION

Generally, a "collective-house" (e.g. an apartment, office building, hotel, etc.) requires numerous communication lines for conveying audio transmissions between a guard post and a household unit (or office unit). Also, in the event of a general broadcast or official announcement, communication lines are required for conveying transmissions between the guard post and all household units (or office units).

In a typical collective-house, a call between a guard post and a particular household unit can be made from a main interphone at the guard post or from an interphone at the particular household unit. However, calls between two household units must be relayed via a concierge stationed at the main interphone at the guard post.

Also, some building complexes may be too large to be accommodated by a single collective-house and may comprise multiple collective-houses. As a result, additional guard posts may be required, and thus, making direct calls between separate collective-houses or between different guard posts may be impossible.

Figure 1:
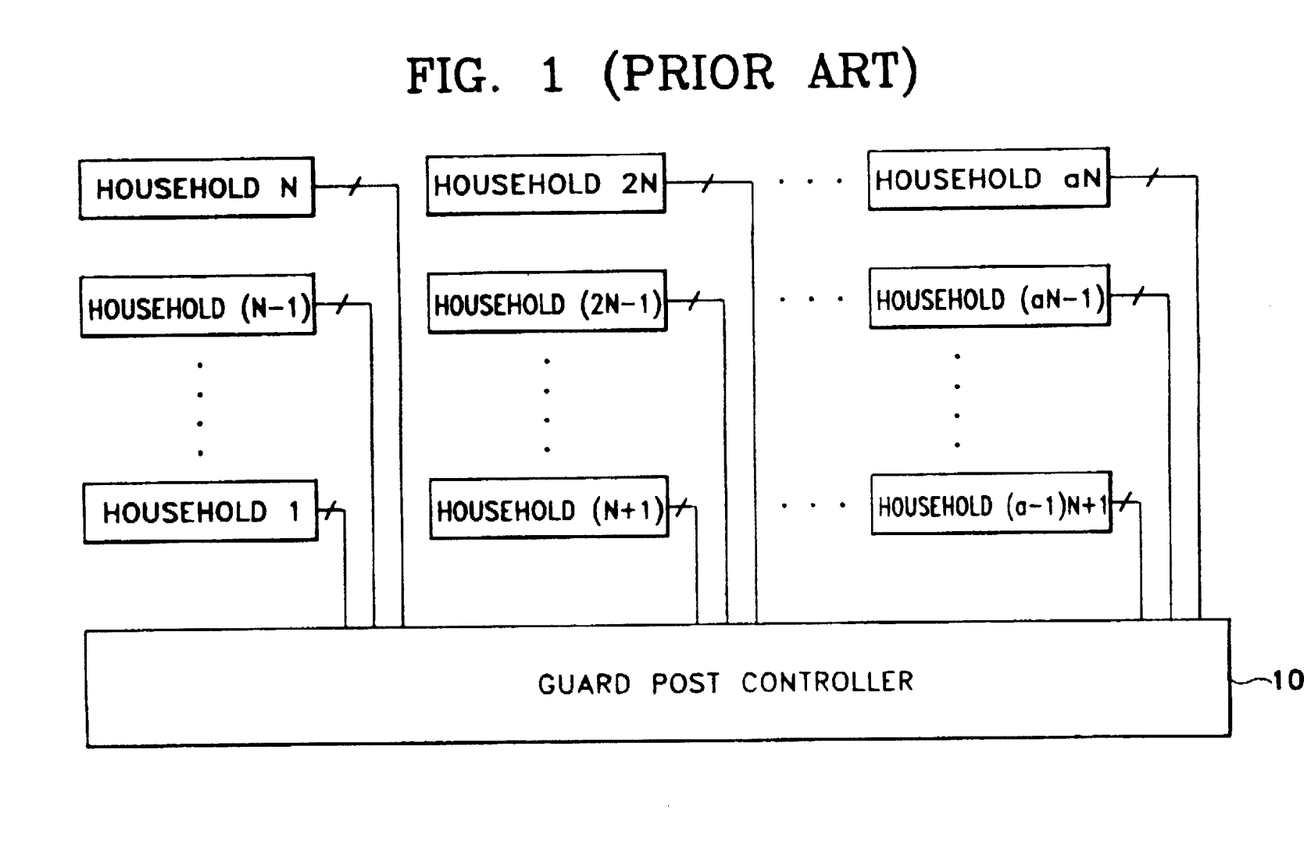
FIG. 1 is a block diagram of a conventional collective-house control system.

An example of a control system for a conventional collective-house is illustrated in FIG. 1. As shown in the figure, the collective-house comprises several groups of household units, and each group comprises N household units. Furthermore, the collective-house includes a guard post controller 10 which is connected to each of the household units via a plurality of communication lines. For example, three communication lines may be connected between the controller 10 and each household unit. Two of the communication lines may be for transmitting calls between the household unit and the controller 10, and the additional line may transmit broadcast announcements from the controller 10 to all of the household units. As a result of the configuration above, a call among many household units or a call between household units within a particular group cannot always be made. Specifically, such calls are only possible if they are manually relayed by a concierge stationed at the guard post controller 10.

As indicated above, the control system of conventional collective-houses has several disadvantages. For example, the system requires numerous communication lines to be installed between each household unit and one or more guard posts. Thus, the design of the control system is complicated, and the maintenance costs of the system are relatively high. Also, direct calls between household units, conference calls among many household units, calls between different collective-houses, and calls between different guard posts are impossible. In addition, a concierge must be permanently stationed at each and every guard post in order to enable calls between household units.

In order to overcome the above disadvantages, a control system which uses a single coaxial line network has been invented by an employee of the present assignee. An application for the control system has been filed in Korea and in the United States, and such system will be briefly described in conjunction with FIG. 2.

Figure 2:
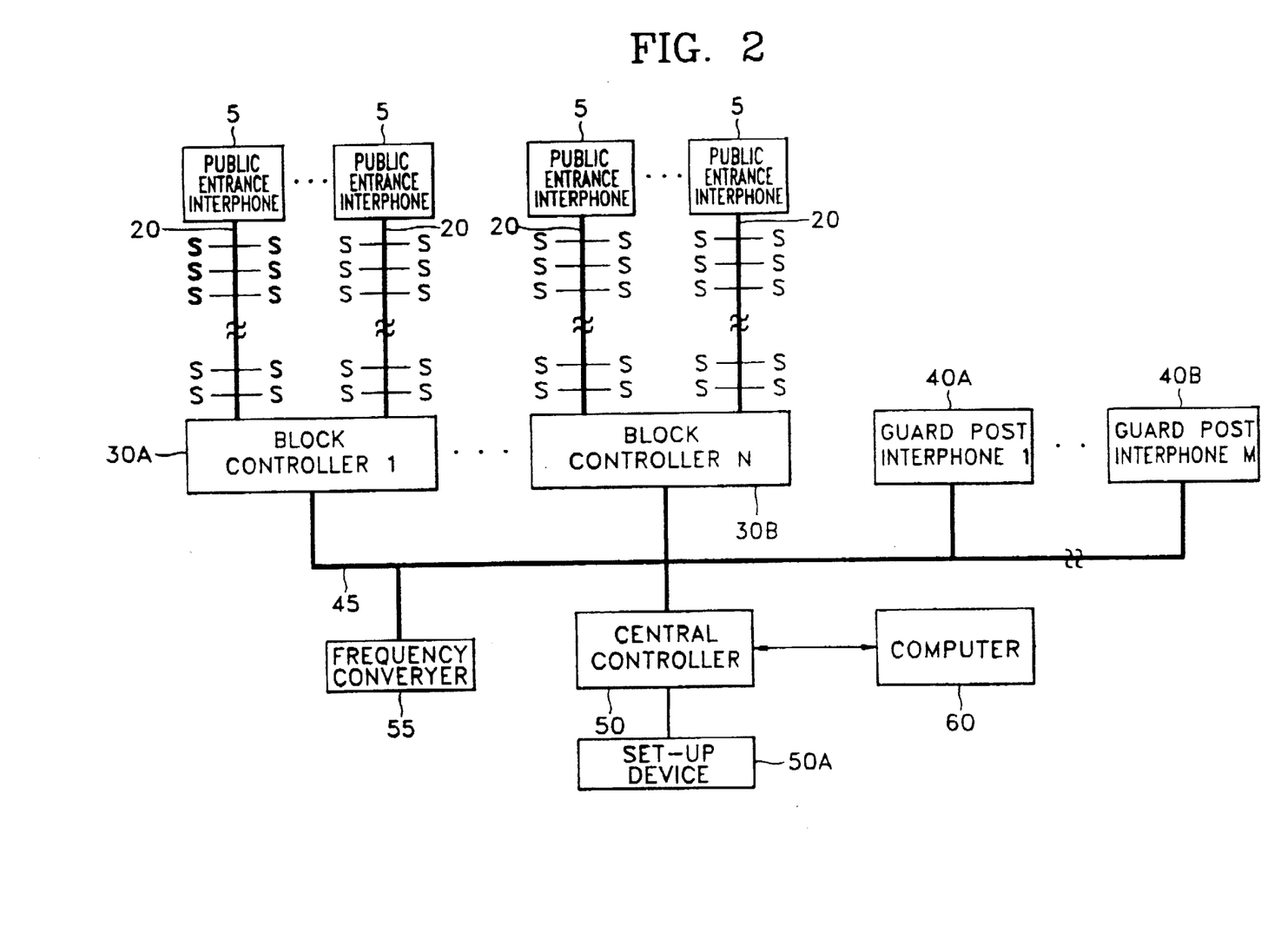
FIG. 2 is a schematic block diagram of another collective-house control system.

FIG. 2 schematically represents a control system for controlling various interphones in a collective-house. In the illustrative embodiment, the collective-house contains a plurality of household units and public entrances which provide access to at least some of the household units. Specifically, a plurality of the household units which are accessed by a common public entrance may be grouped together to form a sub-block of household units, and a group of sub-blocks may be grouped together to form a block of household units.

The system for controlling the interphones of the collective-house may be similarly organized. In particular, the control system comprises household interphones S, public entrance interphones 5, and block controllers 30A and 30B. The plurality of household interphones S are respectively installed in the plurality of household units, and the plurality of entrance interphones 5 are respectively installed at the public entrances.

The household interphones S and the public entrance interphone 5 which are installed in the household units and public entrance belonging to the same sub-block may be grouped together to form a sub-block of interphones and may all be interconnected via a coaxial line 20. Therefore, the public entrance interphone 5 can be used to call a particular household within the particular sub-block or to call a concierge at located at the public entrance.

In addition, several sub-blocks of interphones may also be grouped together to form a block of interphones and may be all connected to one of the block controllers (e.g. controller 30A). As a result, the controller 30A can control calls between two different household interphones S within a single block.

The control system also comprises a plurality of guard post interphones 40A and 40B which are located at gate guard posts and which are connected to the block controllers 30A and 30B via the coaxial line 45. Concierges may be stationed at the gate guard posts to control the operations of one or more of the blocks of household interphones S via the guard post interphones 40A and 40B. Furthermore, interphones 40A and 40B may be used to indirectly control the blocks of interphones S by providing external control to the block controllers 30A and 30B.

The control system of the collective-house also contains a central controller 50 and a frequency converter 55 which are connected to the coaxial line 45. The central controller 50 controls calls between household interphones S within a block and relays calls between household interphones S located in different blocks. The frequency converter 55 is used to convert the format of a transmitted signal by an interphone into the format of signal which is capable of being received by one or more interphones.

In the present example, a multiple frequency dividing communication method is used for enabling calls and exchanging information over the coaxial lines 20 and 45. In such a communication method, a plurality of frequency-allocated communication channels are required and are created by dividing a frequency band into a transmission band and a reception band. Furthermore, each band is further divided into a plurality of communication channels having a predetermined bandwidth.

For example, the frequency of the transmission band may range from 30 to 35.12 MHz, and the frequency of the reception band may range from 112.705 to 117.825 MHz. Therefore, since the transmission band spans a range of 5.12 MHz (i.e. 35.12 MHz–30 MHz), it can contain 256 communication channels each having a bandwidth of 20 KHz (i.e. 20 KHz×256=5.12 MHz). Similarly, the reception band also contains 256 communication channels each having a bandwidth of 20 KHz. In order to generate the proper frequencies for the transmission and reception bands, the frequency converter 55 may be designed to input a 30 MHz transmission frequency band, convert it into an 117 MHz reception frequency band, and output such result. Furthermore, the number of communication channels may be adjusted by changing the overall bandwidth of the transmission and reception bands and/or by changing the bandwidth of each channel.

The 256 communication channels use two respective control channels for transmitting and receiving control data between the various interphones and other apparatuses, and thus, the transmission and reception communication channels each have 127 channels. In other words, 127 call paths are formed.

In order to effectuate the transfer of signals over the call paths and to control the 254 communication channels, the central controller 50 sends a polling signal to each of the block controllers 30A and 30B and receives a corresponding response signal from each of the block controllers 30A and 30B. Similarly, the controller 50 sends a polling signal to each of the guard post interphones 40A and 40B and receives a corresponding response signal from each of the interphones 40A and 40B.

The central controller 50 also provides block information to the corresponding block controllers 30A and 30B via the transmission and reception channels to control the controllers 30A and 30B. In order to appropriately generate the correct block information, the controller 50 receives information from a set-up device 50A.

To relay calls between household interphones S within the same block, the central controller 50 allocates a predetermined number of communication channels to the block controllers 30A and 30B. When additional communication channels are required from the block controllers 30A and 30B, the central controller 50 allocates additional channels from the remaining non-allocated communication channels. In addition, the central controller 50 and the block controllers 30A and 30B transmit and receive control data via the transmission and reception control channels.

The block controllers 30A and 30B also transmit and receive control data to and from the public entrance interphones 5 and the household interphones S for controlling the communication channels allocated to the block controllers 30A and 30B by the central controller 50. Such control data is transmitted by using a carrier sense multiple access with collision detection (CSMA/CD) method which adopts a baseband alternative mark inversion (AMI) waveform.

When a call is made between two household interphones S within the same block, the corresponding block controller 30A or 30B relays the call from the transmitting interphone S to the receiving interphone S. Specifically, the block controller 30A or 30B selects one of the communication channels previously allocated to it by the controller 50 and allocates such channel to the household interphones S transmitting and receiving the call.

When a call is made between two household interphone S which are located in separate blocks, the block controllers 30A and 30B must use the central controller 50 to relay calls between the two blocks. In particular, the central controller 50 allocates one of the non-allocated communication channels to the corresponding block controller 30A or 30B, and the block controller 30A or 30B reallocates such communication channel to the corresponding household interphone S. As a result, two communication channels for transmitting the call between the two interphones S are allocated to each of the interphones S.

In addition, each household interphone S also has the capability of detecting various information relating to its corresponding household. In particular, the interphones S are connected to various sensors which detect intruders, gas leakage, electricity leakage, etc. and convert the detected information into corresponding control data. Then, the interphones S transmit the data to its associated block controller 30A or 30B via the control channel, and the controller 30A or 30B relays such data to the central controller 50.

Subsequently, the central controller 50 transmits the data to the guard post interphones 40A and 40B to convey such information to the concierge at the gate guard post. As a result, the concierge can contact the particular household of the supervised block or another gate guard post by transmitting a call from the guard post interphones 40A and 40B. Also, the concierge can remotely correct various problems encountered by each household such as turning off the supply of electricity or gas to the household.

The control system of the collective-house also comprises a computer 60 which stores information relating to each household. Furthermore, the computer 60 can process the information and transmit such information to a remote station via a communication network. For example, the computer 60 can transmit information regarding the safety of all households to the proper authorities by selectively outputting an appropriate audio signal to the remote station via a public telephone network.

SUMMARY OF THE INVENTION

One object of the present invention is to provide a collective-house control system employing an interface circuit for AMI control communication.

To achieve the above object, there is provided a collective-house control system employing an interface circuit for AMI control communication, which includes spatially separate blocks, each block having a plurality of households, comprising: interphone means installed at each of the households; at least one block controller for relaying a call between households within each block; central controlling means for relaying a call in response to a requirement of the block controller for a call relay; and an interface circuit for performing an AMI control communication between the block controller and the interphone means, wherein the interface circuit for performing an AMI communication comprises: an AMI signal generating unit for receiving first and second signals and generating an AMI signal; a data detecting unit for receiving the AMI signal and detecting control data; a controlling unit for receiving the control data from the data detecting unit, decoding the control data, outputting corresponding PLL data in the case of control data for channel determination, encoding external control data from the interphone means installed at each household to thereby generate the first and second signals for generating the AMI signal, and generating a transmission stop signal in response to a collision detecting signal; a logic circuit unit for masking the first and second signals in response to one of the collision detecting signal and the transmission stop signal, detecting the encoded control data from the first and second signals, and outputting the detected control data; and a collision detecting unit for determining whether there is a collision between the control data from the data detecting unit and the encoded control data from the logic circuit unit, and outputting the collision detecting signal if the collision is continuously detected for a predetermined time.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
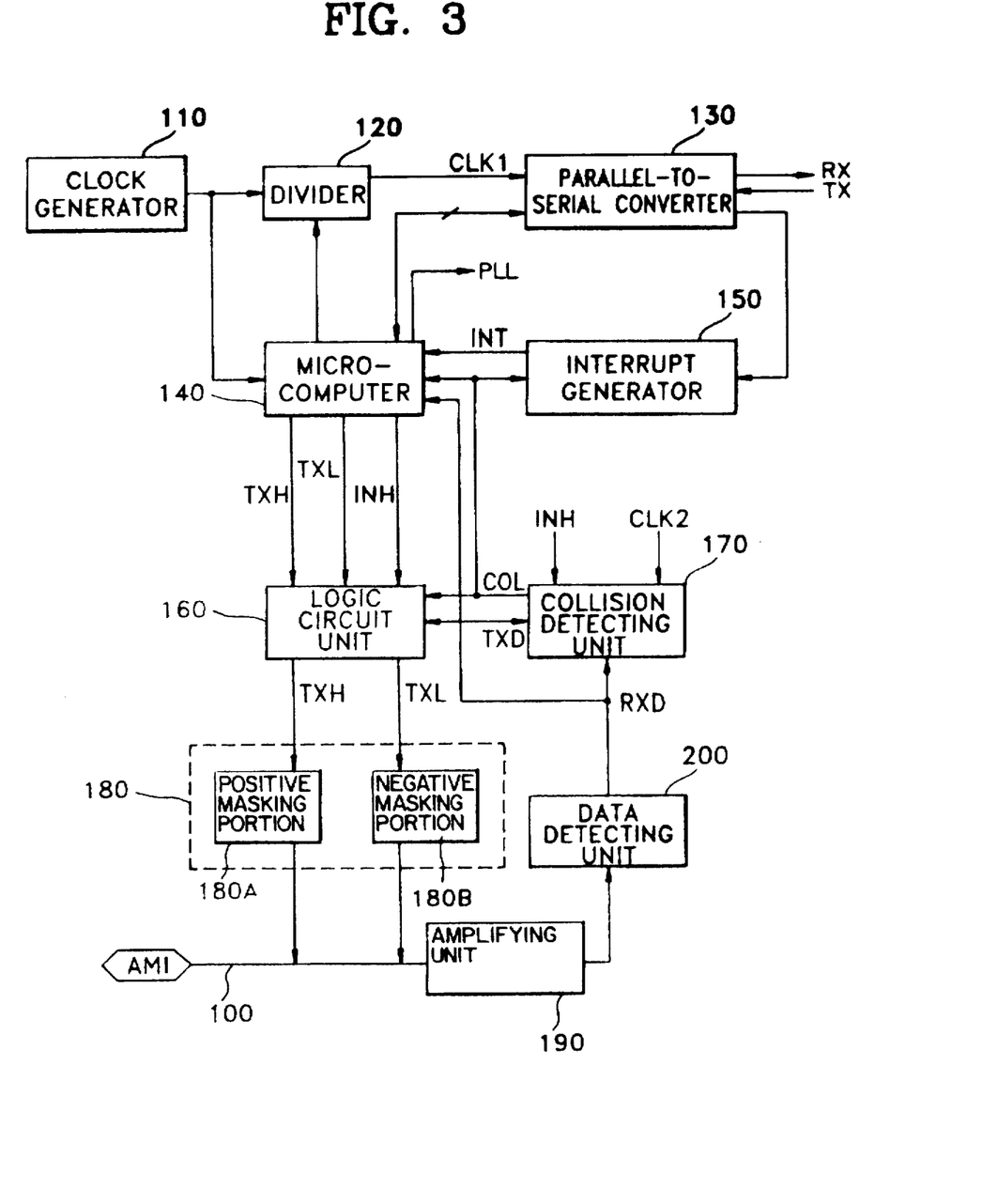
FIG. 3 is an alternative mark inversion (AMI) signal interface circuit for AMI control communication according to the present invention.

The present invention relates to an interface circuit for alternative mark inversion (AMI) control communication, and an illustrative embodiment of such circuit is shown in FIG. 3. As shown in the figure, the interface circuit comprises an oscillator 110, a divider 120, a parallel-to-serial converter 130, a microcomputer 140, an interrupt generator 150, a logic circuit unit 160, a collision detecting unit 170, an AMI signal generating unit 180, an amplifying unit 190, and a data detecting unit 200.

The interface circuit is capable of receiving serial data Tx from a household interphone S and converting the data Tx to an AMI signal. In particular, the circuit receives the serial data Tx via the parallel-to-serial converter 130, converts the data Tx into the AMI signal, and outputs the AMI signal via an input/output terminal 100. In addition, the interface circuit is capable of receiving an AMI signal via the signal line 20 and converting the AMI signal into serial data Rx. Specifically, the circuit receives the AMI signal via the input/output terminal 100, converts the AMI signal into the serial data Tx, and outputs the data Tx via the parallel-to-serial converter 130. In order to more fully describe the operations of the interface circuit, the various components comprising the circuit will be described in more detail below.

The oscillator 110 generates a clock signal CLK having a predetermined frequency, and outputs such signal to the microcomputer 140 and the divider 120. The microcomputer uses the clock signal CLK to synchronize it various operations such as the inputting and outputting of various control signals and data. The divider 120 inputs the clock signal CLK and generates a second clock signal CLK1 by dividing the signal CLK in accordance with a dividing value output from the microcomputer 140.

The parallel-to-serial converter 130 inputs the clock signal CLK1 and uses such signal CLK1 to synchronize its various operations. For example, the clock signal CLK1 may be used to synchronize the reception and transmission of the serial data Rx and Tx and the reception and transmission of parallel data. In addition, the signal CLK1 may be used to synchronize the conversion of the serial data Tx into parallel data and the conversion of parallel data into the serial data Rx.

In order to convert the serial data Tx from the household interphone S into and AMI signal, the data Tx is input to the parallel-to-serial converter 130, and the converter 130 begins converting the data Tx into parallel data. The converter 130 also outputs state signals relating to the reception and transmission states of the converter 130 to the interrupt generator 150. When the state signals indicate that the converter 130 is receiving the data Tx, the generator 150 outputs an interrupt signal INT to the microcomputer 140 to instruct the microcomputer to receive the parallel data from the converter 130.

After receiving the interrupt signal INT, the microcomputer 140 outputs the dividing value to the divider 120 so that the divider 120 outputs a clock signal CLK1 having the appropriate frequency. Then, the microcomputer 140 inputs the parallel data from converter 130 and converts the data into a transmission high signal TXH and a transmission low signal TXL.

The signals TXH and TXL are output to the logic circuit unit 160, and such signals TXH and TXL are masked in accordance with a transmission stop signal INH output from the microcomputer 140. In particular, if the microcomputer 140 does not output the stop signal INH, the unit 160 outputs the transmission high and transmission low signals TXH and TXL to the AMI signal generating unit 180. On the other hand, if the transmission stop signal INH is output, the logic circuit unit 160 does not output such signals TXH and TXL.

In addition, the logic circuit unit 160 generates transmission data TXD based on the signals TXH and TXL and outputs such data TXD to the collision detecting unit 170. The collision detecting unit 170 uses the transmission data TXD to determine if a collision has occurred between data being received and transmitted by the interface circuit. The operation of detecting the collision of data will be described below in more detail.

The AMI signal generating unit 180 inputs the transmission high signal TXH and the transmission low signal TXL from the logic circuit unit 160 and generates a corresponding AMI signal. Specifically, the generating unit 180 comprises a positive masking portion 180A and a negative masking portion 180B which respectively input the signals TXH and TXL. The masking portion 180A generates a positive signal based on the high signal TXH, and the masking portion 180B generates a negative signal based on the low signal TXL. Then, the positive and negative signals are combined at the input/output terminal 100 to produce the AMI signal.

In order to convert the an external AMI signal input via the signal line 20 into the serial data Rx, the external AMI signal is input to the amplifying unit 190 via the input/output terminal 100. The amplifying unit 190 amplifies the AMI signal and outputs the amplified signal to the data detecting unit 200. Then, the data detecting unit 200 detects and extracts reception data RXD contained in the amplified signal and outputs such data RXD to the microcomputer 140 and the collision detecting unit 170. As illustrated above, the amplifying unit 190 and the data detecting unit 200 input the external AMI signal and convert the signal into a general digital data signal.

The microcomputer 140 receives the serial RXD and decodes the data RXD if necessary. Then, the microcomputer 140 converts the data RXD into parallel data and outputs the parallel data to the parallel-to-serial converter 130 based on the timing of the clock signal CLK. Furthermore, the microcomputer 140 outputs a dividing value to the divider 120 so that the divider outputs a clock signal CLK1 having the proper frequency to the converter 130.

In addition, the microcomputer 140 outputs channel assigning data PLL to designate a particular communication channel over which data may be transmitted to or received by the household interphone S. The microcomputer 140 may generate the channel assigning data PLL in accordance with the data RXD if the data RXD contains certain channel information or may generate the data PLL based on other data or considerations. Furthermore, the parallel data output by the microcomputer 140 may contain channel assigning data if the reception data RXD contains the appropriate information.

The parallel-to-serial converter 130 inputs the parallel data from the microcomputer 140 and converts the parallel data into the serial data Rx in synchronicity with the clock signal CLK1. Then, the converter 130 outputs the data Rx to its associated household interphone S.

As indicated above, the collision detecting unit 170 determines if a collision has occurred between the transmission data TXD and the reception data RXD. Specifically, the collision detecting unit 170 receives the data TXD and RXD, detects a disparity between the signals, and counts the pulses of a clock signal CLK 2 during the period that a disparity is detected. If more than a predetermined number of pulses are counted during such period, the detecting unit 170 generates the collision detection signal COL. However, if the microcomputer 170 is outputting the transmission stop signal INH, the collision detecting unit 170 stops determining whether a disparity between the data TXD and RXD has occurred because collision detection is not needed.

If a collision has occurred, the unit 170 generates a collision detection signal COL and outputs the signal COL to the interrupt generating unit 150 and the microcomputer 140. The generating unit 150 detects variations in the signal COL and generates the interrupt signal INT in response to such variations. The microcomputer 140 also inputs the signal COL and generates the transmission stop signal INH to instruct the logic circuit unit 160 to cease outputting the transmission high and low signals TXH and TXL when a collision has occurred.

Figure 4:
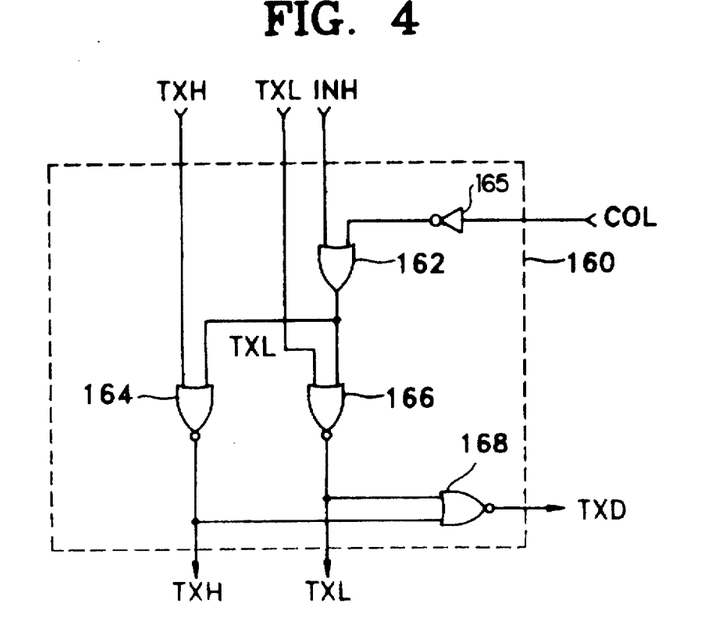
FIG. 4 is a circuit diagram of the logic circuit unit shown in FIG. 2.

FIG. 4 illustrates a more detailed example of the logic circuit unit 160 shown in FIG. 3. Specifically, the logic circuit unit 160 comprises an OR gate 162, three NOR gates 164, 166, and 168, and an inverter 165. The inverter 165 inputs the collision detection signal COL output from the collision detecting unit 170 and outputs an inverted signal. The OR gate 162 inputs the inverted signal and the transmission stop signal INH from the microcomputer 140 and performs an OR operation on such signals.

The NOR gates 164 and 166 selectively output the signals TXH and TXL from the microcomputer 140 based on the output of the OR gate 162. In particular, the NOR gate 164 inputs the signal TXH and the output of the OR gate 162 and produces a low signal whenever the output of the OR gate 162 is high. Similarly, the NOR gate 166 inputs the signal TXL and the output of the OR gate 162 and produces a low signal whenever the output of the OR gate 162 is high. Thus, the NOR gates 164 and 166 do not output the signals TXH and TXL whenever the transmission stop signal INH output from the microcomputer 140 is high or whenever the collision detection signal COL output from the detecting unit 170 is low. Furthermore, the NOR gate 168 inputs the output of the NOR gates 164 and 166 and performs a NOR operation on such signals to produce the transmission data TXD.

Figure 5:
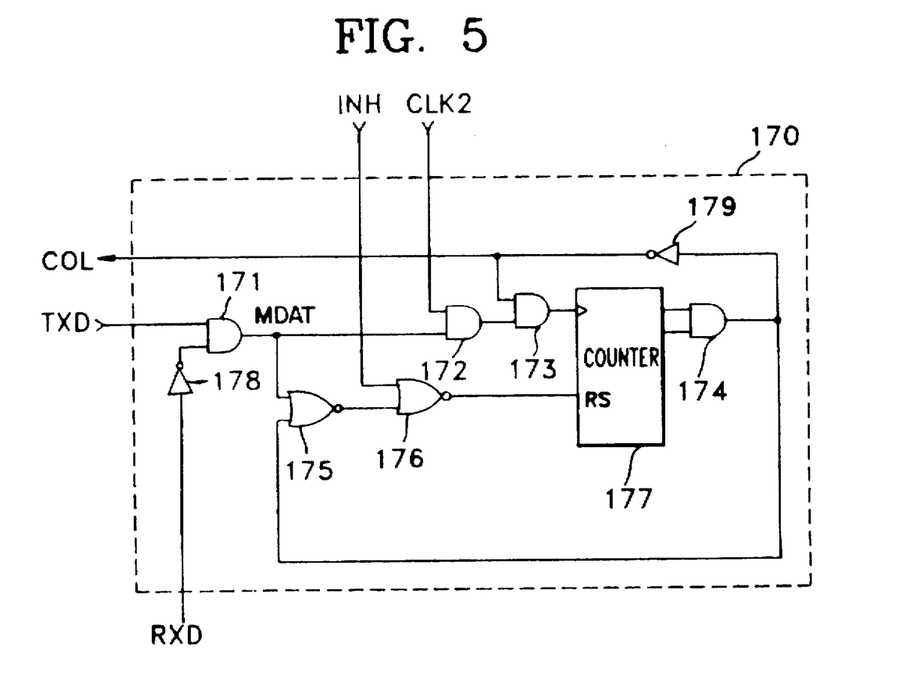
FIG. 5 is a circuit diagram of the collision detecting unit shown in FIG. 2.

FIG. 5 illustrates a more detailed example of the collision detecting circuit 170 shown in FIG. 3. Specifically, the collision detecting unit 170 comprises four AND gates 171–174, two NOR gates 175 and 176, a counter 177, and two inverters 178 and 179.

The inverter 178 inverts the reception data RXD from the data detecting unit 200 and outputs an inverted signal. The AND gate 171 inputs the inverted signal and the transmission data TXD from the logic circuit unit 160 performs an AND operation on such signals to produce a multiplied data signal MDAT. Accordingly, the signal MDAT is high only when the data TXD is high and the data RXD is low.

The AND gates 172 and 173 selectively apply the clock signal CLK2 to the counter 177 based on the multiplied data signal MDAT and the collision detection signal COL, respectively. Specifically, the AND gate 172 inputs the signal MDAT and the clock signal CLK2 and outputs the signal CLK2 only when the signal MDAT is high. Furthermore, the AND gate 173 only outputs the signal from the AND gate 171 when the collision detection signal COL is high. Accordingly, the clock signal CLK2 is only applied to the counter 177 when the data TXD is high, the data RXD is low, and the signal COL is high. In other words, when the data TXD is high and the data RXD is low, the counter 177 continuously counts the pulses of the clock signal CLK2 when the collision detection signal COL is high.

When the value of the counter 177 reaches a predetermined value, the two outputs of the counter 177 which are connected to the AND gate 174 become high, and thus, the AND gate 174 outputs a high signal. The high signal is applied to the inverter 179, and the inverter 179 inverts the high signal and outputs a low signal. Since the output the inverter 179 constitutes the collision detection signal COL, the signal COL becomes low whenever the value of the counter 177 reaches the predetermined value. In other words, once the data RXD has been low and the data TXD has been high for a predetermined period of time, the transmission collision signal COL becomes low. Therefore, the collision detecting unit 170 detects for a certain disparity between the reception data RXD and the transmission data TXD, and if the disparity is continuously detected for a predetermined number of pulses of the clock signal CLK2, the unit 170 generates the signal COL.

A reset signal RESET is also generated by the NOR gates 175 and 176 and is selectively applied to the counter 177 to reset its value at the appropriate instances. Specifically, the RESET is activated whenever the multiplied data signal MDAT is low and the collision detection signal COL is high or whenever the transmission stop signal INH is high.

An illustrative example of the application the interface circuit to a control system of a collective-house will be described below. In particular, the application of interface circuit to the control system shown in FIG. 2 will be described in conjunction with FIGS. 6 and 7.

Figure 6:
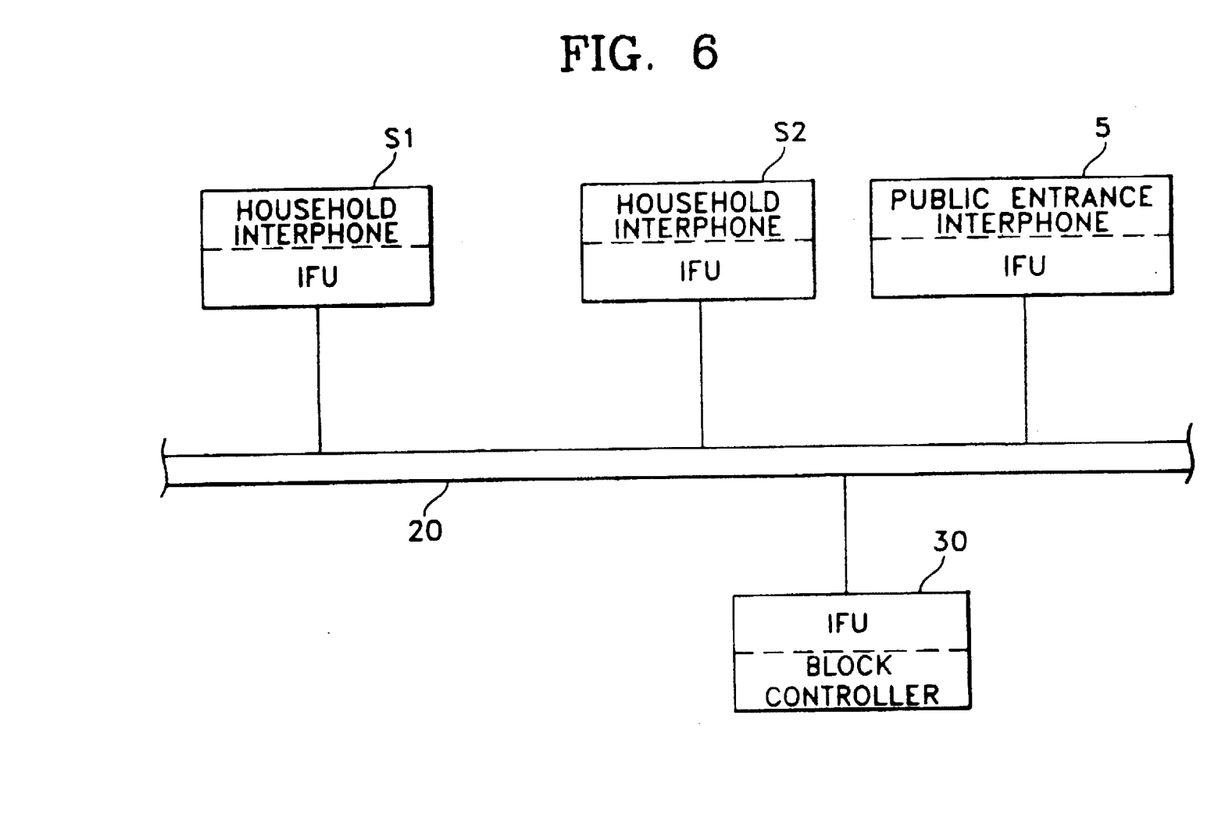
FIG. 6 is a schematic diagram for explaining the layout of interface circuits contained in the collective-house control system of FIG. 2.

FIG. 6 shows an illustrative example of the orientation of a plurality of interface circuits (IFUs), a plurality of household interphones S, a public entrance interphone 5, a block controller 30, and a coaxial line 20. Specifically, an IFU is connected between each household interphone S and the coaxial line 20, and an IFU is connected between the public entrance interphone 5 and the coaxial line 20. Furthermore, the coaxial line 20 is also connected to the block controller 30.

Figure 7:
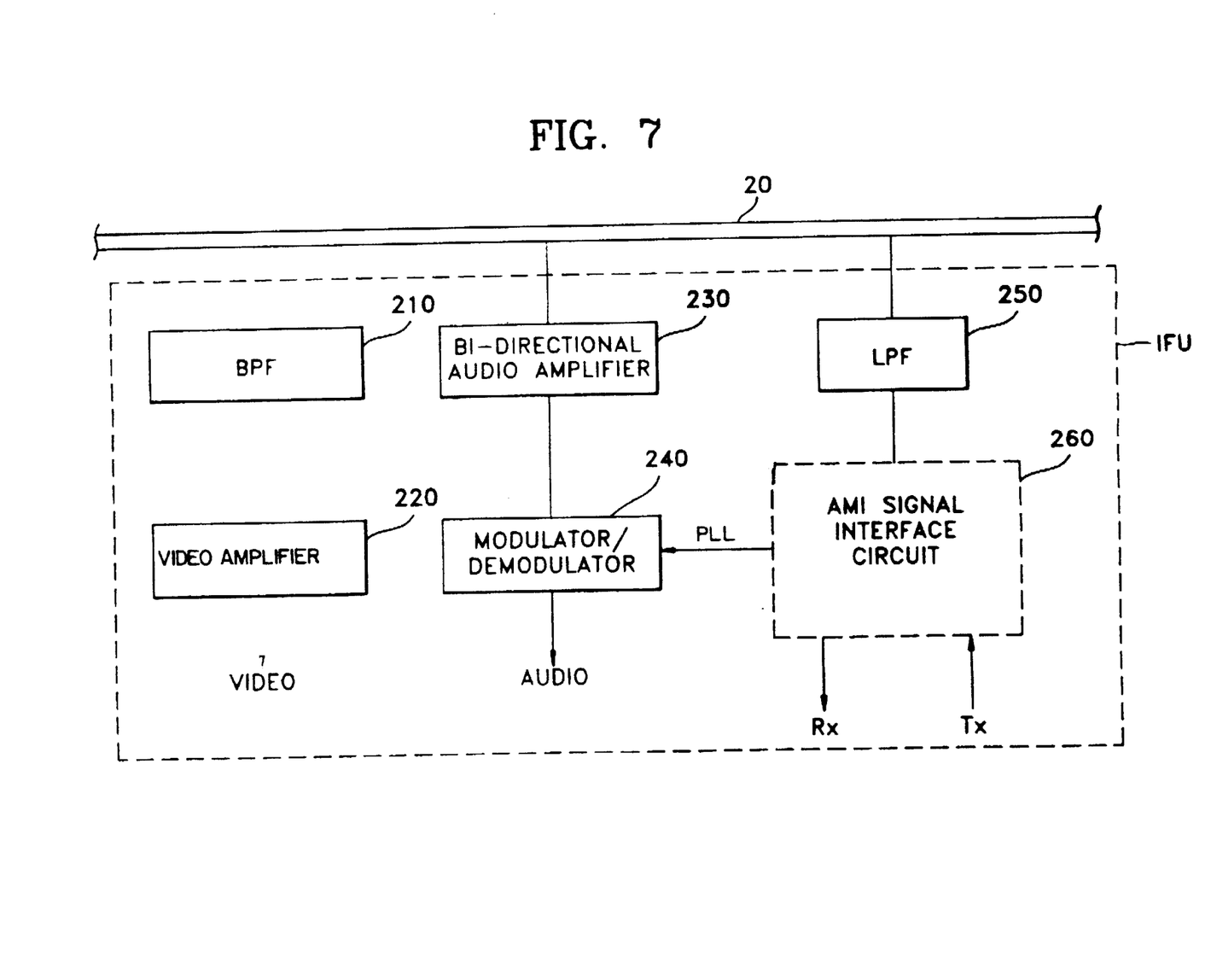
FIG. 7 is a detailed circuit diagram of an interface circuit shown in FIG. 6.

FIG. 7 illustrates a more detailed example of the IFUs shown in FIG. 6. In particular, the IFU comprises a bandpass filter (BPF) 210, a video amplifier 220, a bi-directional audio amplifier 230, a modulator/demodulator 240, and a low pass filter (LPF) 250. Also, the IFU comprises the AMI signal interface circuit 260 shown in FIG. 3.

The band pass filter 210 extracts video signals transmitted along with other signals on the single coaxial line 20 and outputs the video signals to the video amplifier 220. The video amplifier 220 amplifies the signals and outputs the amplified video signal to a certain video device.

The bi-directional audio amplifier 230 inputs modulated audio signals from the coaxial line 20 and amplifies such signals. The amplified signals are input to the modulator/demodulator 240 which demodulates the audio signals and outputs the demodulated signals to a particular audio device. In addition, the modulator/demodulator 240 inputs demodulated audio signals from a certain audio device and transforms the audio signals into modulated signals. Then, the audio amplifier 230 inputs the modulated signals, amplifies such signals, and outputs the amplified signals to the coaxial line 20.

The low-pass filter (LPF) 250 inputs and low-pass-filters an AMI signal input from the coaxial line 20 and outputs the AMI signal to the AMI signal interface circuit 260. As described above, the circuit 260 converts the AMI signal into serial data Rx and outputs the data Rx to an appropriate device. Conversely, the AMI interface circuit 260 inputs serial data Tx and converts such data Tx to an AMI signal. Then, the AMI signal is output to the low-pass filter 250 which low-pass-filters the AMI signal and outputs such signal to the coaxial line 20.

In addition, as described above, the AMI signal interface circuit 260 may generate channel assigning data PLL based on information contained in the AMI signal. Such data PLL may be output to instruct the modulator/demodulator 240 to modulate or demodulate a corresponding audio signal in a particular manner such that the audio signal is assigned a particular channel. Thus, the audio signal can be output to (or input from) the appropriate device which is configured to receive (or transmit) the signal over the particular channel.

As described above, the present invention provides an interface circuit for AMI control communication. Furthermore, the present invention enables AMI communication between a block controller and a household interphone in a collective-house control system, and thus, increases the speed and efficiency of communications regulated by the control system.

While only certain embodiments of the invention have been specifically described herein, it will apparent that numerous modifications may be made thereto without departing from the spirit and scope of the invention. Therefore, the present invention is to be defined by the attached claims and not be limited by the disclosed embodiments.

What is claimed is:

1. A control system for a collective-house, wherein said control system has an interface circuit for performing alternative mark inversion (AMI) control communication, wherein said collective-house comprises a plurality of first households grouped together in a first block, and wherein said control system comprises:

a plurality of interphones respectively installed at said plurality of first households, wherein said plurality of interphones comprise a first interphone and a second interphone;

a first block controller which is connected to said plurality of interphones and which relays a call between said first and second interphones; and a plurality of interface circuits respectively connected to said plurality of interphones for performing an AMI control communication between said first block controller and said interphones, wherein each of said interface circuits comprises:

a data detecting unit which receives input AMI signals from said first block controller and detects first control data within said input AMI signal;

a controlling unit operatively connected to said data detecting unit and a corresponding interphone, wherein said controlling unit receives said first control data from said data detecting unit and outputs channel assigning data in accordance with said first control data if said first control data contains channel information, and wherein said controlling unit inputs second control data from said corresponding interphone and generates a first signal for generating an output AMI signal, an AMI signal generating unit operatively connected to said controlling unit for receiving first signal and generating said output AMI signal in accordance with said first signal, wherein said output AMI signal is output to one of said first block controller and one of said plurality of first households.

2. The control system as claimed in claim 1, further comprising:

a collision detecting unit for detecting a collision between said first control data output from said data detecting unit and detected control data, wherein said collision detecting unit outputs a collision detecting signal if said collision is continuously detected for more than a predetermined period of time;

a logic circuit unit operatively connected to said controlling unit, said AMI signal generating unit, and said collision detecting unit, wherein said logic circuit unit masks said first signal in response to said collision detecting signal and wherein said logic circuit unit generates said detected control data based on said first signal output from said controlling unit and outputs said detected control data to said collision detecting unit.

3. The control system as claimed in claim 2, wherein said controlling unit is operatively connected to said collision detecting unit and generates a transmission stop signal in response to said collision detecting signal.

4. The control system as claimed in claim 3, wherein said logic circuit unit masks said first signal in response to one of said collision detecting signal and said transmission stop signal.

5. The control system as claimed in claim 2, wherein said controlling unit generates said first signal and a second signal in accordance with said second control data, wherein said logic circuit unit masks said first and second signals in response to said collision detecting signal, and wherein said logic circuit unit generates said detected control data based on said first and second signal output from said controlling unit.

6. The control system as claimed in claim 5, wherein said controlling unit is operatively connected to said collision detecting unit and generates a transmission stop signal in response to said collision detecting signal and wherein said logic circuit unit masks said first and second signal in response to one of said collision detecting signal and said transmission stop signal.

7. The control system as claimed in claim 5, wherein said AMI signal generating unit receives said first and second signals and generates said output AMI signal in accordance with said first and second signals.

8. The control system as claimed in claim 7, wherein said AMI signal generating unit comprises:
   a first masking portion which inputs said first signal and generates a first portion of said output AMI signal based on said first signal; and
   a second masking portion which inputs said second signal and generates a second portion of said output AMI signal based on said second signal.

9. The control system as claimed in claim 2, wherein said collision detecting unit comprises:
   detecting means for detecting a collision between said first control data and said detected control data;
   masking means for selectively outputting a clock signal when said detecting means detects said collision; and
   counting means for counting clock pulses of said clock signal output from said masking means, wherein said collision detecting signal is generated when said counting means counts a predetermined number of said clock pulses.

10. The control system as claimed in claim 9, wherein said collision detecting unit further comprises:
    resetting means for resetting a value of said counting means to an initial number when said collision is no longer detected by said detecting means or when said transmission stop signal is output from said controlling unit.

11. The control system as claimed in claim 1, wherein said control system further comprises:
    a plurality of second interphones respectively installed at a plurality of second households, wherein said plurality of second interphones comprise a third interphone and a fourth interphone and wherein said plurality of second households are grouped together in a second block;
    a second block controller which is connected to said plurality of second interphones and which relays a call between said third and fourth interphones; and
    a central controller for relaying a interblock call from said first interphone to said third interphone in response to a request from said first block controller.

12. The control system as claimed in claim 1, wherein said interblock call is sequentially transmitted from said first interphone to said first block controller, from said first block controller to said central controller, from said central controller to said second block controller, and from said second block controller to said third interphone.

13. An interface circuit for alternative mark inversion (AMI) control communication via a single coaxial line, comprising:
    a data detecting unit which receives input AMI signals from said single coaxial line and detects first control data within said input AMI signal; and
    a controlling unit operatively connected to said data detecting unit,
       wherein said controlling unit receives said first control data from said data detecting unit and generates an output signal in accordance with said first control data and wherein said controlling unit inputs second control data and generates a first signal for generating an output AMI signal,
    an AMI signal generating unit operatively connected to said controlling unit for receiving said first signal and generating said output AMI signal in accordance with said first signal.

14. The control system as claimed in claim 13, further comprising:
    a collision detecting unit for detecting a collision between said first control data output from said data detecting unit and detected control data, wherein said collision detecting unit outputs a collision detecting signal if said collision is continuously detected for more than a predetermined period of time; and
    a logic circuit unit operatively connected to said controlling unit, said AMI signal generating unit, and said collision detecting unit, wherein said logic circuit unit masks said first signal in response to said collision detecting signal and wherein said logic circuit unit generates said detected control data based on said first signal output from said controlling unit and outputs said detected control data to said collision detecting unit.

15. The control system as claimed in claim 14, wherein said controlling unit is operatively connected to said collision detecting unit and generates a transmission stop signal in response to said collision detecting signal.

16. The control system as claimed in claim 15, wherein said logic circuit unit masks said first signal in response to one of said collision detecting signal and said transmission stop signal.

17. The control system as claimed in claim 14, wherein said controlling unit generates a second signal in accordance with said second control data,
    wherein said logic circuit unit masks said first and second signals in response to said collision detecting signal, and
    wherein said logic circuit unit generates said detected control data based on said first and second signals output from said controlling unit.

18. The control system as claimed in claim 17, wherein said controlling unit is operatively connected to said collision detecting unit and generates a transmission stop signal in response to said collision detecting signal and wherein said logic circuit unit masks said first and second signals in response to one of said collision detecting signal and said transmission stop signal.

19. The control system as claimed in claim 17, wherein said AMI signal generating unit receives said first and second signals and generates said output AMI signal in accordance with said first and second signals.

20. The control system as claimed in claim 19, wherein said AMI signal generating unit comprises:
    a first masking portion which inputs said first signal and generates a first portion of said output AMI signal based on said first signal; and
    a second masking portion which inputs said second signal and generates a second portion of said output AMI signal based on said second signal.

21. The control system as claimed in claim 14, wherein said collision detecting unit comprises:
    detecting means for detecting a collision between said first control data and said detected control data;
    masking means for selectively outputting a clock signal when said detecting means detects said collision; and
    counting means for counting clock pulses of said clock signal output from said masking means, wherein said collision detecting signal is generated when said counting means counts a predetermined number of said clock pulses.

22. The control system as claimed in claim 21, wherein said collision detecting unit further comprises:

resetting means for resetting a value of said counting means to an initial number when said collision is no longer detected by said detecting means or when said transmission stop signal is output from said controlling unit.

* * * * *